Patented Aug. 12, 1952

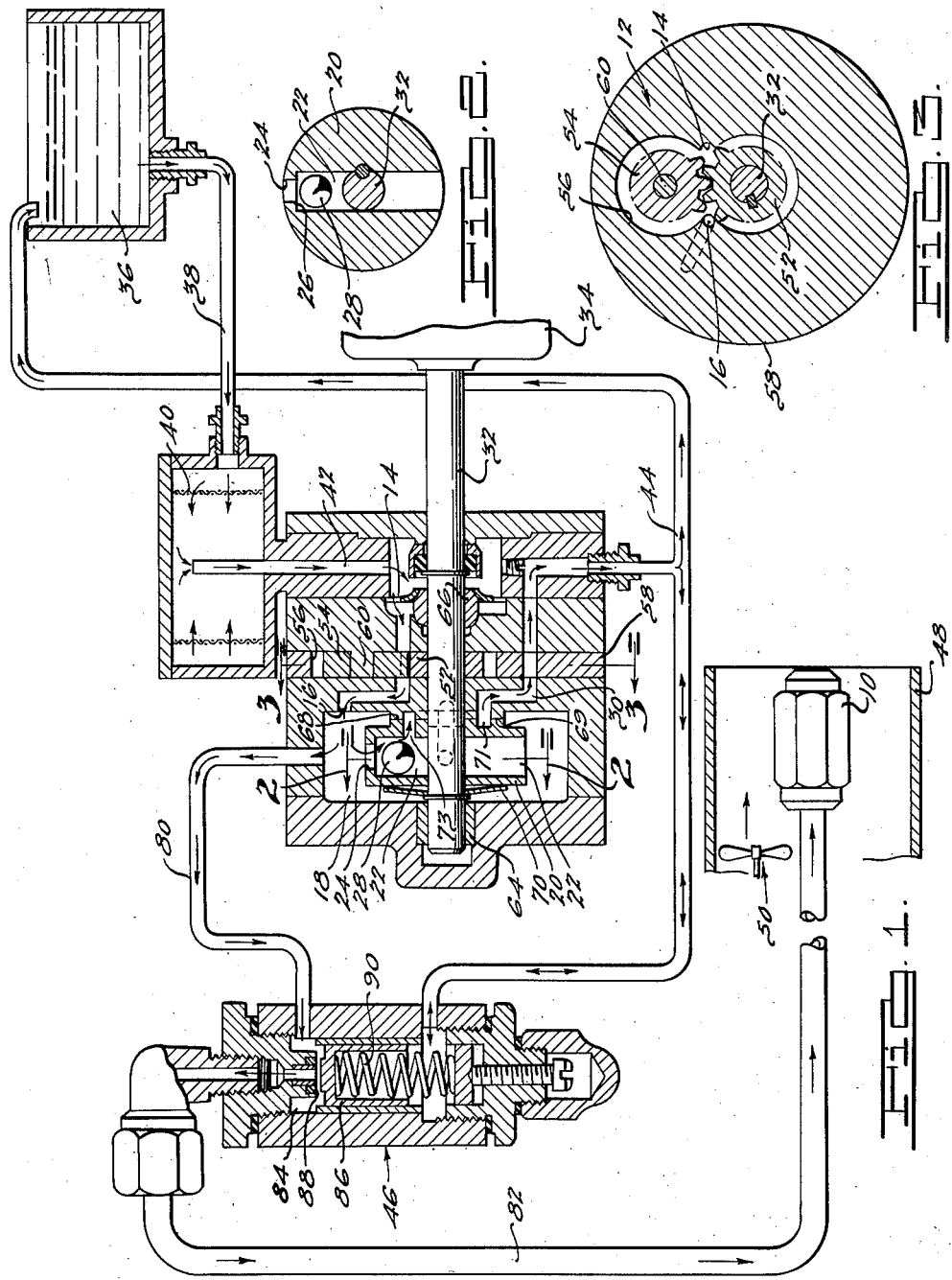

2,606,499

UNITED STATES PATENT OFFICE 2,606,499

PRESSURE REGULATOR

Robert R. Witherell, Bloomington, Ill., assignor to Eureka Williams Corporation, Bloomington, Ill., a corporation of Michigan Application December 11, 1948, Serial No. 64,829

14 Claims. (Cl. 103—11)

This invention relates to pressure regulating devices and systems which have particular application in connection with oil burners.

Successful oil burner operation requires that the flow of oil to the nozzle of the burner be provided only when sufficient atomizing pressure has been developed and the required air delivery established to support combustion. This condition must be met at both the start and the end of an operating cycle, and is desirable during the operating period if subnormal conditions arise due to reduced motor speed.

Various types of centrifugally operated valves have been suggested and/or used heretofore to interlock valve operation with motor speed, either by application of centrifugal force exerted by a rotated mass to the valve closure, or through an electric speed responsive switch controlling the action of an electrically operated valve, but various complications usually arise in translating the centrifugal force or the motor speed to obtain suitable valve action.

This invention contemplates a novel method of correlating motor speed with valve action in which resistance to flow is created by directing a rotated mass against a fluid stream so as to generate hydraulic pressure as a function of the motor speed, the pressure generated being transmitted and directed against the actuating diaphragm of a shutoff valve.

The following table computed from the laws governing centrifugal force illustrates the corresponding operating pressures that can be generated at various angular speeds:

| Percent of Angular Speed | Percent of Normal Hydraulic Pressure |
|---|---|
| 0 | 0 |
| 10 | 1 |
| 20 | 4 |
| 30 | 9 |
| 40 | 16 |
| 50 | 25 |
| 60 | 36 |
| 70 | 49 |
| 80 | 64 |
| 90 | 81 |
| 100 | 100 |

According to this invention a hydraulically operated shutoff valve is designed to open or close, as the requirements demand, when a predetermined hydraulic pressure differential has been created, and to reverse the valve action when the hydraulic pressure is reduced below the predetermined operating level.

A principal object of the invention, therefore, is to provide a new and improved pressure regulating device and system.

Another object of the invention is to provide a speed responsive pressure regulating device in which resistance to flow of the fluid is obtained by impinging a ball under the influence of centrifugal force against the fluid stream so as to create a pressure corresponding to the angular speed of the motor or drive shaft.

Another object of the invention is to provide a new and improved oil burner and fuel pumping and pressure regulating system therefor.

Other and further objects of the invention will be apparent from the following description and claims and will be understood by reference to the accompanying drawing, of which there is one sheet, which by way of illustration shows a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a schematic illustration, with parts shown in section, of an oil burner embodying the invention;

Fig. 2 is a sectional view taken along the line 2—2 of Fig. 1; and

Fig. 3 is a sectional view taken along the line 3—3 of Fig. 1.

As illustrated in the embodiment of the invention selected for purposes of illustration, an oil burner embodying the pressure regulating device and system comprises a nozzle 10, a pump 12 having an inlet 14 and an outlet 16, a discharge chamber 18 connected to the outlet of the pump 12 so as to receive liquid fuel discharged by the pump, and a rotor 20 in said discharge chamber 18 and arranged to be driven with the pump 12.

The rotor 20 is provided with a valve chamber or radially extending passage 22 having a port 24 which communicates with the discharge chamber 18. An inwardly facing valve seat 26 is formed around the port 24 inside of the chamber 22, and a valve in the form of a ball 28 is freely arranged in the chamber 22 and adapted under the influence of centrifugal force to seat on the seat 26 so as to close the port 24. A communication 30 extends between the valve chamber 22 and the inlet 14 of the pump. The rotor 20 and pump 12 are driven by the shaft 32 of an electric motor 34.

The inlet 14 of the pump is supplied with liquid fuel from a reservoir 36 through conduit 38, strainer 40, and conduit 42. The port 24, valve chamber 22, and communication 30 form a by-pass between the inlet and outlet of the pump. The communication 30 may also be connected to a conduit 44, one end of which opens into the top of the reservoir 36 and the other end of which communicates with a normally closed pressure responsive valve indicated generally at 46.

The oil burner may be of the gun type and include an air or draft tube 48 through and from which a stream of secondary air flows into the combustion chamber of the furnace. An air moving device in the form of a fan diagrammatically illustrated at 50 and driven by the motor 34 may be employed for effecting the flow of secondary air through and out of the tube 48.

The nozzle 10 may be of any conventional construction and is of such nature so as to discharge atomized fuel oil into the stream of air which flows around the nozzle 10 and out of the tube 48. Suitable ignition means may be provided for igniting the combustible mixture which results from the discharge of the atomized oil from the nozzle 10 into the stream of air flowing out of the tube 48.

The pump 12 may be of the gear type and include gears 52 and 54 arranged in a chamber 56 formed in the housing 58. The inlet 14 communicates with the chamber 56 on one side of the gears 52 and 54, the teeth of which are in mesh, and the outlet 16 communicates with the chamber 56 on the other side of the gears. Gear 54 may be mounted for rotation on a stub shaft 60, and gear 52 is mounted on shaft 32 so as to be rotated upon operation of the motor 34, the gear 52 driving the gear 54, the operation of the gear pump pumping liquid fuel from the reservoir 36 into the discharge chamber 18 at a pressure which will be suitable for effecting atomization of the oil as it is delivered from the orifice of the nozzle 10, say for example at a pressure of 100 lb. per square inch at the normal running speed of the shaft 32.

The discharge chamber 18 is formed in the housing 58 and the shaft 32 extends through the chamber 18 and is journalled in bearings 64 and 66. The rotor 20 is mounted on the shaft 32 and keyed thereto so as to rotate therewith, and is provided with a lapped face 68 which is in engagement with a similarly lapped face 69 on one side of the chamber 18. A spring 70 biases the rotor 20 to the right so that the lapped face 68 thereof is in contact with the lapped face 69. The faces 68 and 69 are each provided with an annular groove 71, such grooves being in register and forming a part of the communication 30 between the valve chamber 22 and the pump inlet 14.

The groove 71 in the face 68 of the rotor communicates through duct 73 with the chamber 22. The shaft 32 where it extends through the rotor 20 closes one side of the valve chamber 22. The ball valve member 28 is freely arranged in the chamber 22, and under the influence of centrifugal force will move toward the seat 26 so as to close or restrict the port 24 between the valve chamber 22 and the discharge chamber 18, depending upon the speed of rotation of the shaft 32 and the pressure of the liquid in the discharge chamber 18.

When the shaft 32 is stopped, the valve member 28 will be unseated from the seat 26 unless it just happens that the seat 26 is directly below the shaft 32, in which event gravity will seat the valve 28, but there would at such time be no other force and no pressure tending to maintain the valve seated. Therefore, disregarding the action of gravity, the centrifugally responsive valve which comprises the valve member 28 and its seat 26 and the rotor 20 is open when the shaft 32 is at rest.

When the motor 34 begins to drive the shaft 32 the pump 12 and the rotor 20 will be driven and centrifugal force will cast the ball valve member 28 outwardly toward its seat 26 so as to resist the fluid flow from the discharge to the intake of the pump and thereby create a pressed differential. The valve 46 at this time is closed.

The valve 46 is arranged in a delivery conduit comprising parts 80 and 82 between the discharge chamber 18 and the nozzle 10, one end of the conduit 80 communicating with the discharge chamber 18 and the other end communicating with the valve 46. The valve 46 includes a chamber 84 in which a valve member 86 is reciprocable and the conduits 80 and 82 communicate with the chamber 84. The face of the valve member 86 is adapted to seat on a seat 88 and thereby shut off the communication between the chamber 84 and the conduit 82. Spring 90 biases the valve member 86 toward its seat. The conduit 44 has one end in communication with the chamber 84 on the side of the valve member 86 opposite the face thereof which seats on the valve seat 88.

The spring 90 exerts such pressure on the valve member 86 urging it toward its seat that the valve will require such a pressure to open it that such pressure will be sufficient to atomize the oil as it is discharged from the nozzle 10, say for example a pressure of 80 lbs. per square inch. The valve 46 thus will remain closed until sufficient pressure differential has been built up in the valve chamber 18 and the conduit 80, the valve member 28 and the valve 46 being shown in their unseated or open positions.

When the shaft 32 starts to rotate, the valve member 28 will, as previously indicated, be cast toward its seat 26 under the influence of centrifugal force and thereby close or restrict the port 24. However, pressure will build up rapidly in the chamber 18 since the valve 46 is closed, and as soon as the pressure in the chamber 18 exceeds the force holding the valve 28 on its seat the valve 28 will unseat and permit the by-passing of fluid back to the inlet of the pump. However, as the speed of the shaft 32 increases the centrifugal force exerted by the ball valve 28 will increase, the force increasing as the square of the angular velocity of the shaft 32, thereby creating a pressure differential in the discharge chamber 18 which corresponds to the square of the speed of rotation of the shaft 32. The hydraulic pressure differential in the discharge chamber 18 when transmitted and applied to the valve member 86 will cause the valve to open only when a predetermined speed of rotation of the shaft 32 is obtained and to permit the valve 46 to close when the speed of rotation of the shaft drops below the predetermined speed.

The valve 28, 26 is constructed and arranged so that sufficient pressure differential to open the valve 46 will be built up only when sufficient speed of rotation of the shaft has been attained, say for example 90% of the normal running speed of the motor 34, and such pressure differential is sufficiently great to effect the atomization of the oil upon discharge thereof from the nozzle. In this way, when the speed of the shaft 32 falls below the predetermined speed, the valve 46 will be closed and the flow of oil to the nozzle 10 will stop.

Since the centrifugal force acting on the ball 28 will vary as the square of the speed of rotation of the shaft 32, when the speed of the shaft 32 falls below the predetermined speed the valve 28 will move away from the seat 26 and quickly relieve the pressure in the discharge chamber 18. The ball valve 28 under the influence of centrifugal force resists the flow of liquid fuel through the port 24 into the valve chamber 22, and the force on the ball valve will decrease much more rapidly than the deceleration of the motor shaft whereby the by-pass between the outlet and inlet of the pump 12 will be quickly opened and the pressure in the discharge chamber 18 rapidly dissipated, thereby permitting the valve 46 to close quickly so as to obtain a sharp cut off of fuel at the nozzle 10.

The fan 50 is driven with the shaft 32 and will set up a flow of air past the nozzle 10 before the atomized oil is discharged from the nozzle 10 upon the starting of the motor 34, and after the motor circuit is opened the fan 50 will continue to supply air past the nozzle 10 after the valve 46 has been shut off.

Since the valve 28, 26 opens quickly when the shaft 32 decelerates below the predetermined speed at which the valve is set to operate, the pressure differential in the chamber 18 is dissipated extremely rapidly due to the sudden opening of the valve 28, 26 and hence the valve 46 can close quickly since the pressure in the chamber 84 will drop quickly as soon as the valve 28, 26 opens. It will be observed that the flow of fuel through the by-pass is resisted by the ball 28 which is projected by centrifugal force against the fluid stream entering the valve chamber 22 through the port 24.

Although the invention is shown in connection with an oil burner, its use is not limited thereto and it may be applied to any pressure regulating system of any fluid wherein pressure is to be created as the square of the angular velocity of the drive shaft and transmitted to effect the function of an auxiliary device, such as a valve or switch.

While I have illustrated and described a preferred embodiment of my invention, it is understood that this is capable of modification and I therefore do not wish to be limited to the precise details set forth, but desire to avail myself of such changes and alterations as fall within the purview of the following claims.

I claim:

1. A liquid pumping system comprising a pump having an inlet and an outlet, a chamber connected to the outlet of said pump so as to receive liquid discharged by said pump, a rotor in said chamber and arranged to be driven with said pump, said rotor having a radially extending passage terminating at its outer end in a port which communicates with said chamber, a valve seat within said passage, a valve member movable in said passage under the influence of centrifugal force upon rotation of said rotor toward said valve seat to seat thereon and close said port, a communication between the interior of said passage and the inlet of said pump, a delivery conduit leading from said chamber and a valve in said conduit constructed and arranged to be opened when the liquid pressure in said chamber exceeds a predetermined amount, said port, passage and communication forming a by-pass between the inlet and outlet of said pump, said valve member when seated closing said by-pass, the movement of said valve member towards said seat under the influence of centrifugal force being resisted by the fluid flow through said by-pass from the outlet to the inlet of said pump.

2. A liquid pumping system according to claim 1 wherein said valve in said delivery conduit is a normally closed pressure responsive valve which is constructed and arranged to be opened by the pressure of the liquid in said chamber.

3. A pressure regulating system comprising a pump having an inlet and an outlet, a discharge chamber connected to the outlet of said pump so as to receive liquid discharged by said pump, a rotor in said chamber and arranged to be driven with said pump, said rotor having a valve chamber provided with a port which communicates with said discharge chamber, a valve seat within said valve chamber, a valve member movable in said valve chamber, under the influence of centrifugal force upon rotation of said rotor, toward said valve seat to seat thereon and close said port, a communication between the interior of said valve chamber and the inlet of said pump, said port, valve chamber and communication forming a by-pass between the inlet and outlet of said pump, said valve member when seated closing said by-pass, a pressure responsive device having a fluid connection with said discharge chamber and operable in response to a predetermined pressure therein, said device creating pressure in the liquid in said discharge chamber so as to cause flow of some of the liquid from said discharge chamber through said by-pass during operation of said pump, the movement of said valve member towards said seat under the influence of centrifugal force being resisted by the fluid flow through said by-pass from the outlet to the inlet of said pump.

4. A liquid pressure system comprising a pump having an inlet and an outlet, a discharge chamber connected to the outlet of said pump so as to receive liquid discharged by said pump, a rotor in said chamber and arranged to be driven with said pump, said rotor having a valve chamber provided with a port which communicates with said discharge chamber, a valve seat within said valve chamber, a valve member movable in said valve chamber under the influence of centrifugal force upon rotation of said rotor, toward said valve seat to seat thereon and close said port, a communication between the interior of said valve chamber and the inlet of said pump, a delivery conduit leading from said discharge chamber, said port, valve chamber and communication forming a by-pass between the inlet and outlet of said pump, said valve member when seated closing said by-pass, means connected to said delivery conduit operable to create pressure in the liquid in said discharge chamber so as to cause flow of some of the liquid from said discharge chamber through said by-pass during operation of said pump, the movement of said valve member towards said seat under the influence of centrifugal force being resisted by the fluid flow through said by-pass from the outlet to the inlet of said pump.

5. A liquid pumping system comprising a pump having an inlet and an outlet, a chamber connected to the outlet of said pump so as to receive liquid discharged by said pump, a rotor in said chamber and arranged to be driven with said pump, said rotor having a radially extending passage terminating at its outer end in a port which communicates with said chamber, an inwardly facing valve seat within said passage, a ball valve member freely arranged and movable in said passage under the influence of centrifugal force upon rotation of said rotor toward said valve seat to seat thereon and close said port, a communication between the interior of said passage and the inlet of said pump, a delivery conduit leading from said chamber and a valve in said conduit constructed and arranged to be opened when the liquid pressure in said chamber exceeds a predetermined amount, said port, passage and communication forming a by-pass between the inlet and outlet of said pump, said valve member when seated closing said by-pass, the movement of said valve member towards said seat under the influence of centrifugal force being resisted by the fluid flow through said by-pass from the outlet to the inlet of said pump.

6. A pumping system according to claim 5 wherein a wall of said chamber is provided with an annular groove which forms a part of said communication, said rotor being biased against said wall and having an opening in communication with said passage and groove.

7. A liquid pumping system comprising a pump having an inlet and an outlet, a chamber connected to the outlet of said pump so as to receive liquid discharged by said pump, a rotor in said chamber and arranged to be driven with said pump, said rotor having a radially extending passage terminating at its outer end in a port which communicates with said chamber, a valve seat within said passage, a valve member movable in said passage under the influence of centrifugal force upon rotation of said rotor toward said valve seat to seat thereon and close said port, a communication between the interior of said passage and the inlet of said pump, a delivery conduit leading from said chamber and a normally closed valve in said conduit constructed and arranged to be opened when the liquid pressure in said chamber exceeds a predetermined amount, said port, passage and communication forming a by-pass between the inlet and outlet of said pump, said valve member when seated closing said by-pass, the movement of said valve member towards said seat under the influence of centrifugal force being resisted by the fluid flow through said by-pass from the outlet to the inlet of said pump, said valve having a movable valve element exposed on one side thereof to the pressure of the liquid in said chamber and arranged to be opened thereby, and a fluid connection between the other side of the valve and said communication.

8. A pressure regulating system comprising a liquid pump having an inlet and an outlet, a discharge chamber connected to the outlet of said pump so as to receive liquid discharged by said pump, a rotary valve in said chamber driven with said pump and constructed and arranged to close in response to centrifugal force, a communication through which liquid can flow from said chamber to the inlet of said pump, a pressure responsive device having a fluid connection with said discharge chamber and operable in response to a predetermined pressure therein, said device creating pressure in the liquid in said discharge chamber so as to cause flow of some of the liquid from said discharge chamber through said communication during operation of said pump, said valve being arranged in said communication so as to resist the flow of liquid therethrough and being effective upon rotation thereof to create a pressure differential between the outlet and inlet side of the pump which varies in accordance with the square of the speed of rotation of said valve.

9. A pressure regulating and liquid pumping system according to claim 8 wherein said chamber is provided with a delivery conduit leading therefrom, and said device comprises a valve constructed and arranged in said conduit so as to be opened when the liquid pressure in said chamber exceeds a predetermined amount.

10. A liquid pumping system comprising a pump having an inlet and an outlet, a chamber connected to the outlet of said pump so as to receive liquid discharged by said pump, a rotor in said chamber and arranged to be driven with said pump, said rotor having a radially extending passage terminating at its outer end in a port which communicates with said chamber, said port being surrounded by a valve seat, a valve in said passage movable under the influence of centrifugal force upon rotation of said rotor toward seating on said valve seat and closing said port, a communication between the interior of said passage and the inlet of said pump, a delivery conduit leading from said chamber, a normally closed valve in said conduit and means responsive to a predetermined pressure in the liquid in said chamber for opening said normally closed valve.

11. An oil burner comprising a nozzle, a pump having an inlet and an outlet and adapted to supply oil to said nozzle, a discharge chamber connected to the outlet of said pump so as to receive liquid discharged by said pump, a rotor in said chamber and arranged to be driven with said pump, said rotor having a valve chamber provided with a port which communicates with said chamber, said port having a valve seat associated therewith, a valve in said valve chamber constructed and arranged so that under the influence of centrifugal force upon rotation of said rotor said valve will move toward its seat on said valve seat for closing said port, a communication between the interior of said valve chamber and the inlet of said pump, a delivery conduit leading from said discharge chamber to said nozzle, and a valve in said conduit constructed and arranged to be opened when the pressure in said discharge chamber reaches a predetermined amount, a motor operable for driving said pump and rotor at the same time, and means for supplying a stream of air past said nozzle during operation of said pump.

12. A pressure regulating system comprising a pump having an inlet and an outlet, a by-pass between said inlet and outlet, a normally open centrifugally operated valve in said by-pass connected with said pump so as to be driven therewith, said valve including a centrifugally actuated valve member movable toward its closed position in a direction opposite the flow of fluid through said by-pass so that flow of fluid through said by-pass tends to unseat said valve member and movement of said valve member toward its closed position resists the flow of fluid through said by-pass, said valve being constructed and arranged so that said valve member in moving toward closed position moves in response to centrifugal force against the fluid flowing through said by-pass.

13. A pressure regulating system comprising a pump having an outlet, a discharge chamber connected to the outlet of said pump so as to receive fluid discharged by said pump, a rotor in said chamber and arranged to be driven with said pump, said rotor having a valve chamber provided with a port through which fluid flows from said discharge chamber, a valve seat within said valve chamber, a ball valve member movable in said valve chamber, under the influence of centrifugal force upon rotation of said rotor, toward said valve seat to seat thereon and close said port, said ball valve member being movable toward its seat in a direction opposite the flow of fluid through said port so that flow of fluid through said port tends to unseat said ball valve member and movement of said valve member toward its seat resists flow of fluid through said port and a communication leading from the interior of said passage.

14. A liquid pressure system comprising a pump having an outlet, a rotor arranged to be driven with said pump, said rotor having a port which is arranged in fluid flow relation with said pump outlet, a valve seat and valve member on said rotor for controlling the flow of fluid through said port, said valve member being movable under the influence of centrifugal force upon rotation of said rotor, relative to said valve seat to control the flow of fluid therethrough, the flow of fluid through said port being in a direction opposite the movement of said valve member toward its seat so that the movement of said valve member under the influence of centrifugal force is resisted by the fluid flow through said port.

ROBERT R. WITHERELL.

REFERENCES CITED

The following references are of record in the file of this patent:

UNITED STATES PATENTS

| Number | Name | Date |
| --- | --- | --- |
| 1,884,702 | Hubacker | Oct. 25, 1932 |
| 2,112,564 | Haight | Mar. 29, 1938 |
| 2,175,913 | Philipp | Oct. 10, 1939 |
| 2,236,088 | Doeg | Mar. 25, 1941 |